US010366077B2

(12) United States Patent
Bovee et al.

(10) Patent No.: US 10,366,077 B2
(45) Date of Patent: *Jul. 30, 2019

(54) SYSTEMS AND METHODS FOR HOST DETECTION OF USB ASYNCHRONOUS NOTIFICATION CAPABILITY

(71) Applicant: Microsoft Technology Licensing, LLC, Redmond, WA (US)

(72) Inventors: James Bovee, Redmond, WA (US); Lee Prewitt, Mercer Island, WA (US); Ravinder Thind, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/449,784

(22) Filed: Mar. 3, 2017

(65) Prior Publication Data

US 2017/0177659 A1    Jun. 22, 2017

Related U.S. Application Data

(63) Continuation of application No. 13/789,088, filed on Mar. 7, 2013, now Pat. No. 9,589,010.

(51) Int. Cl.
*G06F 17/30* (2006.01)
*G06F 16/23* (2019.01)
(Continued)

(52) U.S. Cl.
CPC ........ *G06F 16/2379* (2019.01); *G06F 3/0607* (2013.01); *G06F 3/0625* (2013.01);
(Continued)

(58) Field of Classification Search
None
See application file for complete search history.

(56) References Cited

U.S. PATENT DOCUMENTS 6,532,535 B1 *   3/2003   Maffezzoni ......... G06F 11/1458
                                                                    713/1
6,546,437 B1     4/2003   Grimsrud
(Continued)

FOREIGN PATENT DOCUMENTS

JP    2005209288 A    8/2005
JP    2008500617 A    1/2008
(Continued)

OTHER PUBLICATIONS

US 5,567,921 A1, 05/2003, Guziak (withdrawn)
(Continued)

*Primary Examiner* — Debbie M Le
(74) *Attorney, Agent, or Firm* — Davin Chin; Chin IP, PLLC

(57) ABSTRACT

Systems and methods for detecting legacy storage devices that may falsely and/or incorrectly report to host systems that they have removable media. Such false or incorrect reporting may cause the host system to periodically poll the storage device as to whether the device is ready for I/O processing. Such polling would be unnecessary and represent a waste of power expended by the host system. In one embodiment, the present system may implement processes that periodically poll storage media and update a database. The database would be a listing of storage devices indicating whether they truly have removable media or falsely report that they have removable media. In another embodiment, the present system may apply some heuristically testing to determine whether a storage device so falsely indicates removable media. In another embodiment, telemetry service may be used by a group of hosts to share data regarding such storage devices.

20 Claims, 5 Drawing Sheets

(51) Int. Cl.
G06F 13/38 (2006.01)
G06F 3/06 (2006.01)

(52) U.S. Cl.
CPC .......... *G06F 3/0632* (2013.01); *G06F 3/0653* (2013.01); *G06F 3/0674* (2013.01); *G06F 3/0685* (2013.01); *G06F 13/385* (2013.01); *Y02D 10/14* (2018.01); *Y02D 10/151* (2018.01)

(56) References Cited

U.S. PATENT DOCUMENTS

| | | | |
|---|---|---|---|
| 7,124,248 B2* | 10/2006 | Huffman | G06F 1/3221 |
| | | | 711/115 |
| 7,707,321 B2 | 4/2010 | Lee | |
| 7,819,750 B2 | 10/2010 | Lam et al. | |
| 8,285,909 B2* | 10/2012 | Diefenbaugh | G06F 13/385 |
| | | | 710/313 |
| 8,478,860 B2 | 7/2013 | Roberts et al. | |
| 8,495,297 B2 | 7/2013 | See et al. | |
| 2005/0061336 A1* | 3/2005 | Goetz | A61N 1/37282 |
| | | | 128/899 |
| 2006/0112018 A1* | 5/2006 | Lee | H04L 12/2803 |
| | | | 705/59 |
| 2007/0104042 A1 | 5/2007 | Sugahara et al. | |
| 2008/0071963 A1 | 3/2008 | Chow et al. | |
| 2008/0288098 A1 | 11/2008 | Thanos et al. | |
| 2010/0146279 A1 | 6/2010 | Lu | |
| 2011/0016267 A1 | 1/2011 | Lee | |
| 2011/0161530 A1 | 6/2011 | Pietri et al. | |
| 2014/0258225 A1 | 9/2014 | Bovee et al. | |

FOREIGN PATENT DOCUMENTS

| | | |
|---|---|---|
| JP | 2012008846 A | 1/2012 |
| RU | 2348992 C2 | 3/2009 |
| WO | 2005119469 A2 | 12/2005 |

OTHER PUBLICATIONS

"Intention to Grant Issued in European Patent Application No. 14712874.8", dated Nov. 29, 2016, 26 Pages.
"Notice of Allowance Issued in Japanese Patent Application No. 2015-561512", dated Jan. 22, 2018, 3 Pages.
"Second Office Action Issued in Chinese Patent Application No. 201480012666.7", dated Jul. 11, 2017, 7 Pages.
"Final Office Action Issued in U.S. Appl. No. 13/789,088", dated Mar. 16, 2015, 9 Pages.
"Notice of Allowance Issued in U.S. Appl. No. 13/789,088", dated Jun. 29, 2016, 7 Pages.
"Notice of Allowance Issued in U.S. Appl. No. 13/789,088", dated Nov. 4, 2016, 5 Pages.
"Notice of Allowance Issued in U.S. Appl. No. 13/789,088", dated Dec. 5, 2016, 2 Pages.
"Non-Final Office Action Issued in U.S. Appl. No. 13/789,088", dated Mar. 16, 2015, 9 Pages.
"Notice of Allowance Issued in European Patent Application No. 14712874.8", dated Aug. 1, 2016, 7 Pages.
Translation of Office Action Issued in Chinese Patent Application No. 201480012666.7, dated Apr. 24, 2017, 10 Pages.
"Third Office Action Issued in Chinese Patent Application No. 201480012666.7", dated Sep. 28, 2017, 7 Pages.
"Office Action Issued in Chinese Patent Application No. 201480012666.7", dated Apr. 24, 2017, 7 Pages.
"Search Report and Office Action Issued in Russian Patent Application No. 2015137806", dated Mar. 7, 2018, 9 Pages.
"Notice of Allowance Issued in Mexican Patent Application No. MX/a/2015/011836", dated Feb. 17, 2017, 1 Pages.
"International Preliminary Report on Patentability Issued in PCT Application No. PCT/US2014/020060", dated Mar. 27, 2015, 5 Pages.
"Office Action Issued in European Patent Application No. 14712874.8", dated Sep. 30, 2016, 3 Pages.
"Office Action Issued in Mexican Patent Application No. MX/a/2015/011836", dated Sep. 14, 2016, 2 Pages.
"Second Written Opinion Issued in PCT Application No. PCT/US2014/020060", dated Jan. 16, 2015, 5 Pages.
"International Search Report & Written Opinion for PCT Patent Application No. PCT/US2014/020060", dated May 12, 2014, Filed Date: Mar. 4, 2014, 10 Pages.
Designing Energy Efficient SATA Devices—Published Date: Apr. ##, 2011 Proceedings: NA Author: NA pp. 26.
Mobile Battery Life Solutions for Windows 7—Published Date: Jun. 23, 2009 Proceedings: NA Author: NA pp. 88.
USB 3.0 Technology—Retrieved Date: Feb. 15, 2013 Proceedings: NA Author: Dan Harmon pp. 3.
"Office Action Issued in Australian Patent Application No. 2014226091", dated Oct. 26, 2018, 3 Pages.

* cited by examiner

SYSTEMS AND METHODS FOR HOST DETECTION OF USB ASYNCHRONOUS NOTIFICATION CAPABILITY

CROSS-REFERENCE TO RELATED APPLICATION(S)

This application is a continuation of U.S. patent application Ser. No. 13/789,088, filed Mar. 7, 2013, entitled "SYSTEMS AND METHODS FOR HOST DETECTION OF USB ASYNCHRONOUS NOTIFICATION CAPABILITY,". The entirety of this afore-mentioned application is incorporated herein by reference.

BACKGROUND

Minimal power consumption is an increasing important feature receiving attention in newer computing platforms. Some aspects of the original Universal Serial Bus (USB) mass storage—e.g., Bulk-Only Transport (BOT) and USB Attached SCSI Protocol (UASP)—specifications tend to remain at odds with this trend. Overall power expenditure for a host system connected to a USB mass storage device may be improved with only a minor modification to these existing specifications.

Now, as part of the new USB 3.0 specification, a new feature has been added to improve bus utilization and power efficiency. Certain devices connected via USB 3.0 may now have the ability to notify the host of the device's readiness—in an asynchronous manner, and obviating the need for polling every device connected. In addition, modification of BOT and UASP specifications tends to eliminate the need for another type of polling which detects media state changes in devices with removable media.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and methods for detecting legacy storage devices that may falsely and/or incorrectly report to host systems that they have removable media. Such false or incorrect reporting may cause the host system to periodically poll the storage device as to whether the device is ready for I/O processing. Such polling would be unnecessary and represent a waste of power expended by the host system. In one embodiment, the present system may implement processes that periodically poll storage media and update a database. The database would be a listing of storage devices indicating whether they truly have removable media or falsely report that they have removable media. In another embodiment, the present system may apply some heuristically testing to determine whether a storage device so falsely indicates removable media. In another embodiment, telemetry service may be used by a group of hosts to share data regarding such storage devices.

In one embodiment, a method for detecting storage devices is disclosed, where the storage devices are connected to a host system, such that said storage devices comprises associated metadata, said associated metadata capable of falsely indicating that such storage devices have removable media, the method comprising: sending a media polling message from said host system to a first storage device, said media polling message querying whether said first storage device is ready; and if said first storage device responds as not ready, updating a database that said first storage device has truly removable media.

In another embodiment, a system for detecting storage devices on a host system is disclosed where the storage devices are further comprising associated metadata, and the associated metadata may falsely indicate that said storage device comprises removable storage media, said system comprising: a mass storage driver, said mass storage driver capable of connecting with said storage devices and sending messages to and from said storage devices; a block storage driver, said block storage driver connected to said mass storage driver and capable of sending messages and receiving messages to and from said storage devices; and a processor, said processor capable of sending media polling messages to said storage devices and disabling further media polling messages to said storage devices that do not have truly removable media.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
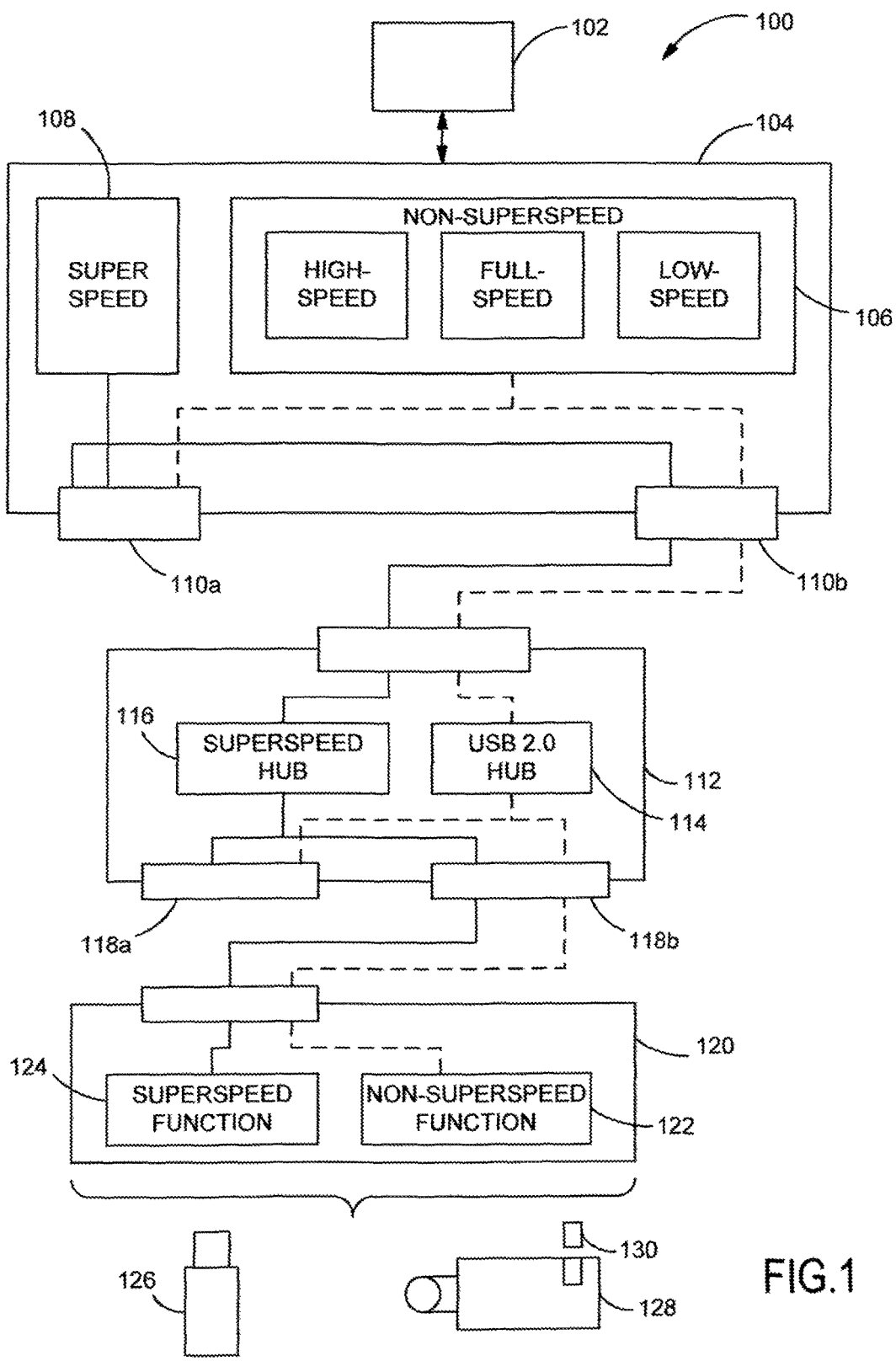
FIG. 1 depicts one embodiment of a typical host/hub/peripheral device configuration environment.

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

In one embodiment, power may be saved by eliminating the polling of media state for USB flash drives. However, it may not be possible to do this safely due to the following reasons: (1) the vast majority of USB Flash Drives (UFDs) that inaccurately report removable media; and (2) there currently exists no method to unambiguously distinguish these UFDs from devices that truly contain removable media (e.g., USB flash card reader devices). This is particularly true of legacy UFDs that encoded (however falsely) that they comprised removable media, when in fact they do not have such removable media.

Now, newer non-legacy devices may implement a new asynchronous notification mechanism by which the host may definitively and safely eliminate media polling without any risk of malfunction or data corruption. However, this does nothing for all of the legacy devices that are currently in use—now and for the foreseeable future.

To understand the situation, FIG. 1 is one exemplary embodiment of one architectural diagram (100) of a typical USB 3.0 host/hub/peripheral device configuration. As may be seen in FIG. 1, the new SuperSpeed bus is a part of a dual-bus architecture that operates alongside with the conventional USB 2.0 bus. Controller 102 may be in communication with USB 3.0 host 104 to provide I/O processing and/or functionality. USB 3.0 host 104 may provide compatible support for legacy USB 2.0 host 106—as well as new SuperSpeed host capability 108. Controller 102 may be a CPU of a system, an I/O controller—or a combination of such controller hardware and/or software components.

The host may comprise a number of ports (e.g., 110a and 110b). The ports may connect with a plurality of hubs 112. Hubs 112 may further comprises legacy hubs 114 and new (e.g., SuperSpeed) hubs 116. Such hubs may in turn connect with a plurality of USB peripheral devices 120—which may comprise a set of non-SuperSpeed functions 122 and SuperSpeed functions 124.

Such peripheral devices may comprise various types of legacy devices—e.g., such as USB flash driver 126 which does not have removable media (which may falsely report that it has removable media to the host) or a camera 128 which may have an actual removable media component (e.g., memory card 130).

Figure 2:
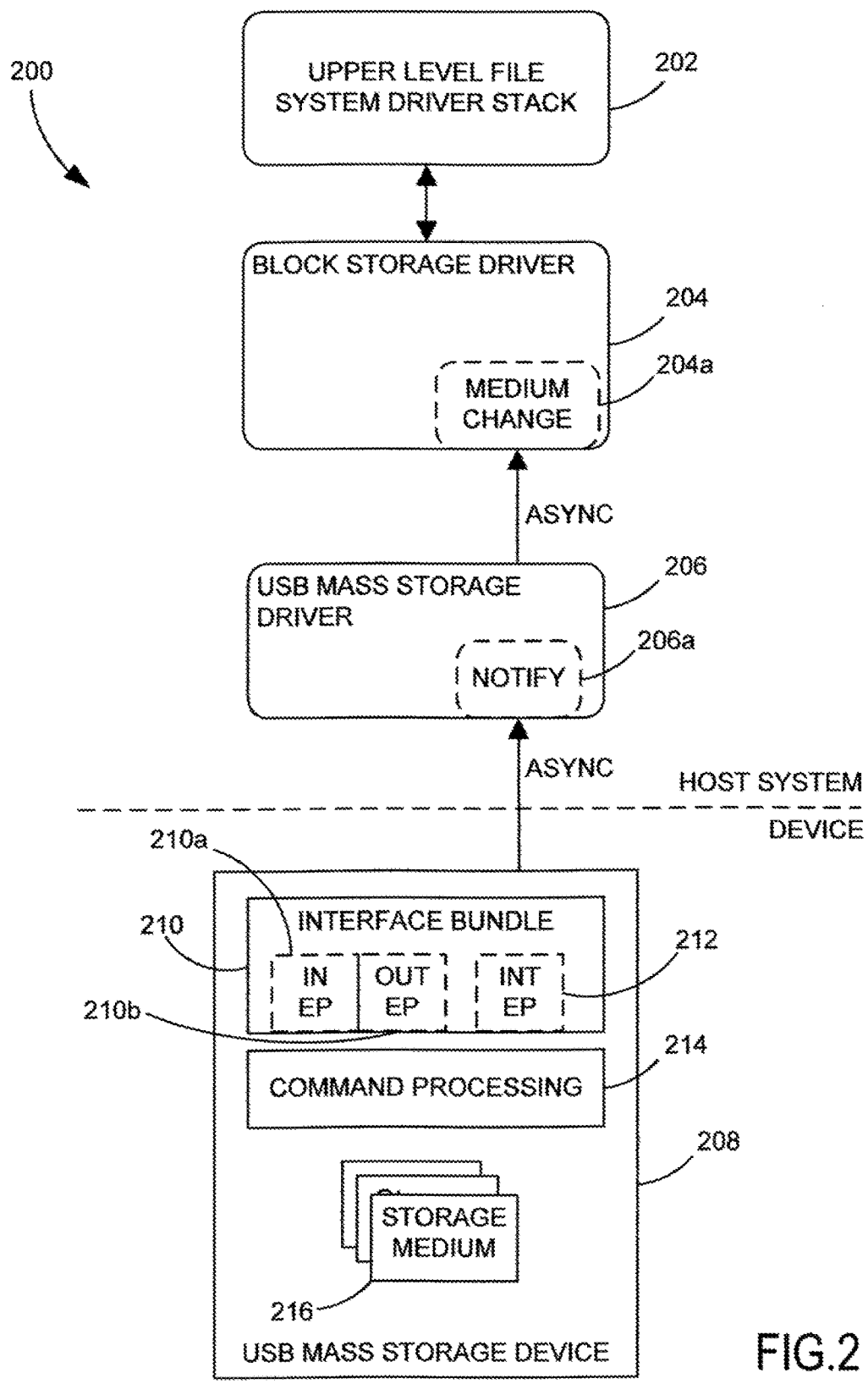
FIG. 2 depicts one exemplary embodiment of processing that may occur under the revised BOT specification.

FIG. 2 depicts an exemplary embodiment (200) of processing that may occur under the revised BOT or UASP specifications. USB Mass Storage Device 208 may comprise storage medium 216—which may or may not be removable, processing unit 214 and an interface bundle 210. Interface bundle 210 may further comprise legacy (e.g., existing BOT and UASP specification) interfaces IN End Point (EP) (210a) and OUT EP 210b—as well as newly-introduced Interrupt End Point (INT EP 212) for asynchronous notice of status.

For example, a change in status regarding whether removable storage has been removed or replaced may be asynchronously signaled to the host system—e.g., to US Mass Storage Driver 206 in a Notify process 206a. This notice may be passed further along asynchronously to Block Storage Driver 204 to a Medium Change process 204a. Finally, such change in status may be report to the Upper Level File System Stack 202.

As previously described, legacy devices will not report such changes in status asynchronously as they are not implemented according to the new specification. In fact, legacy device may be those devices that pre-date the newly proposed modifications to BOT/UASP specifications, or have chosen not to implement these modifications. In addition, legacy devices may falsely report that they have removable media (thus, requiring continuous polling)—even when they do not have such removable media. To better appreciate the various aspects to potential power savings, it may be desirable to consider the impact on various components:

Hubs and Controller Considerations

While managing power for each node of the USB device tree, all children of a particular node must be suspended before that node itself may be suspended. Then, when the entire tree of devices connected to the host controller has been suspended, the controller itself may be suspended. A suspended controller not only saves the power associated with keeping its own circuitry active, it may also lead to lowered host CPU power consumption due to cessation of the interrupts the controller may generate.

CPU Considerations

To keep the host up to date on the current media state of the device with removable media, the system may affect periodic polling with a TEST UNIT READY (TUR) command—e.g., as a media polling message. This corresponds to periodic execution of code in the context of a timer procedure call which tends to keep the CPU in a higher power state due to this activity. In order to attempt to minimize overall system power consumption, it may be desirable to consider the following:

(1) Devices reporting removable media are continuously polled by the host with TEST UNIT READY commands to detect any change in the media state. This tends to consume additional power, keeping the USB device tree as well as the host controller and host CPU active unnecessarily in the absence of actual data I/O; and (2) While connected to more power-optimized hosts, a bus-powered mass storage device might find itself remaining suspended for a more lengthy time period than in previous host versions. This length of time in the suspended state may exceed that which is required for the device to maintain robust operation. In such an environment, the device would require an occasional port resume with port remaining active for a time that allows the device complete some set of internal housekeeping tasks.

Peripheral/Device Types

In some embodiments herein, the benefit obtained in return for implementing the mechanism described may vary according to the type of device. It may be informative to broadly consider two types of removability that may influence the outcome: device removability and media removability. Table 1 below shows examples of various device types representing the permutation of these two properties:

TABLE 1

Device Categories and Removability

|  | Media Removable | Media Non-Removable |
| --- | --- | --- |
| Device Removable | Category 1<br>Flash drive (RMB = 1)<br>Removable flash card | Category 2<br>Flash drive (RMB = 0)<br>External HDD |

TABLE 1-continued

Device Categories and Removability

|  | Media Removable | Media Non-Removable |
| --- | --- | --- |
|  | reader (SD, MMC, MS, xD) Optical drive |  |
| Device Non-Removable | Category 3 Removable flash card reader connected to internal bus | Category 4 HDD connected to internal bus |

Devices in category 1 and 3 would tend to clearly benefit from the elimination of TEST UNIT READY polling, whereas devices in category 2 and 4 may benefit most from the ability to remote wake the port. In addition, it may be desirable to consider that users of category 1 devices are able to simply unplug them in order to conserve power, whereas users of category 3 devices may not be afforded the same choice. It may also be noted that category 3 devices consume system power regardless of whether the removable media slot is occupied or not. In addition, it may be noted that regular USB flash drives appear under both categories 1 and 2. This is true because the majority of existing flash drives specify a bit value 1 (TRUE) for Removable Medium Bit (RMB) and thus induce TEST UNIT READY polling—despite not being true bearers of a removable storage medium. However, some flash drives do accurately represent their non-removable media—e.g., via a Removable Media Bit (RMB) set to zero (that is, RMB=0) and effectively help conserve more power for the attached host system—as compared to devices reporting an inaccurate value (RMB=1).

One Embodiment

As mentioned, the benefits obtained by safely eliminating this unnecessary media polling of USB flash drives are manifold:

(1) Continuous polling tends to keep device active, thus preventing selective suspend. Eliminating polling may allow the device itself to reach the idle state and thus be placed in a low power inactive state;

(2) This may affect not just device but the entire USB device tree—as all intervening hub devices tend to remain active in addition to the USB host controller; and (3) Continuous polling DPC timer may also tend to keep the CPU unnecessarily active.

It would thus be desirable to safely eliminate polling by affecting accurate identification of truly removable reader devices vs. USB flash drives. In addition, making an incorrect identification may cause media changes to be missed, thus possibly leading to degraded function and possible data corruption.

Figure 3:
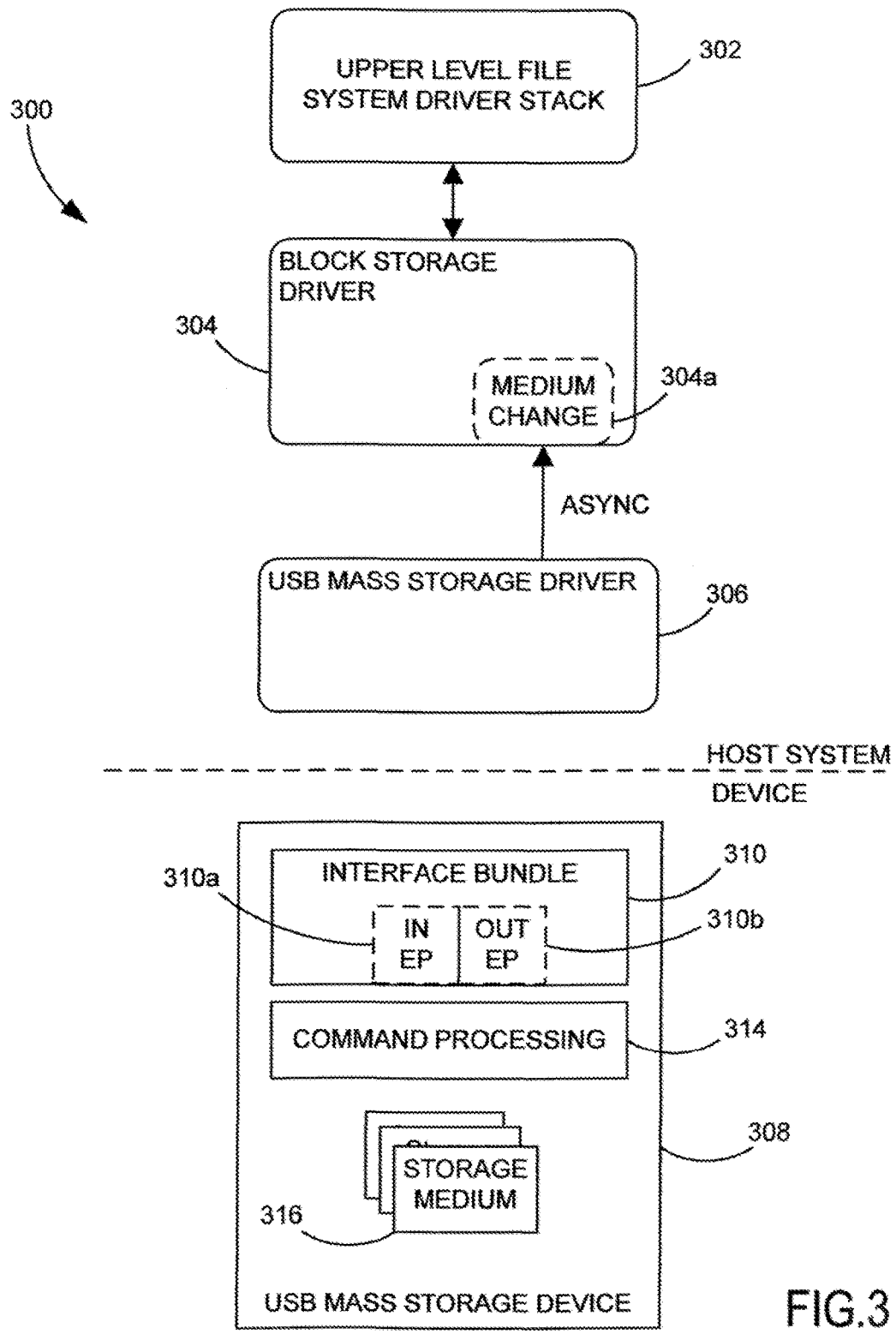
FIG. 3 depicts one exemplary embodiment of a present system as made in accordance with the principles of the present application.

FIG. 3 depicts one exemplary embodiment of a present system (300)—possibly affecting USB 3.0 standard or the like. Legacy USB Mass Storage Device 308 comprises storage medium 316, processing component 314 and interface bundle 310—which may further comprises legacy interfaces IN EP 310a and OUT EP 310b.

In this case, even if the legacy device may incorrectly designate whether it has removable media or not, the system may still be able to employ an asynchronous notification with USB Mass Storage Driver 306 expecting such asynchronous notification—which will not arrive. If the system does receive an asynchronous notification message from a storage devices, then it tends to indicate that the storage device is not a legacy device and the system may treat that device accordingly, including upon receipt of such notification message, the system may update a database that the storage device has truly removable media with its ID or other metadata associated with the storage device. This data and/or database may be shared further via telemetry or otherwise, with other host systems.

Status may be asynchronously passed along to Block Storage Driver 304 via a Medium Change process 304a. Finally, such status may be passed further along to Upper Level File System Driver Stack 302. Block Storage Driver 304 may further comprise a processor—or have access to sufficient processing capability—to execute a Medium Change process or some sufficient process to detect the status of connected storage devices and to query storage devices as to their ready status for I/O processing or RMB status.

In order to affect this power saving asynchronous status update, several embodiments of the present system may employ various techniques and/or methods for improving the correct designation and/or detection of removable media.

For merely one example, it is possible to collate data before shipping products. First, it may be possible to identify as many known (legacy or otherwise) USB flash drives vs. reader devices as possible. Metadata regarding these readers and devices may be placed into a searchable table or other suitable database. This database may be consulted (e.g., as an initial table) and the system may apply the correct polling behavior as appropriate.

However, as this initial table/database may be limited in that it is neither exhaustive nor forward-looking, it may be possible for a host system to use certain follow-on heuristic procedures and/or method to further refine it, as follows:

(1) During initialization, issue a TUR command (or some other "ready" command indicating device is ready for I/O processing) once to some or all Legacy Units (LUNs) reporting RMB=1. If at least one LUN responds to TUR with NOT READY—MEDIA NOT PRESENT, then this is a flash card reader or other device with truly removable media. The system or host may treat it accordingly afterwards—including disabling polling to that devices and/or updating the table/database that the device has truly removable media.

(2) If all report READY, then further evidence may be desired to make an accurate determination. In a telemetry report, it may be possible upload, share data (e.g., updating a device errata database with other hosts) to include the hardware ID of the device (VID and PID), the number of LUNs and the number of times each LUN reported READY vs. NOT READY (this may be desirable as some small population of RMB=0 devices occasionally and intermittently report NOT READY).

(3) Aggregate telemetry sample data and identify the highly likely UFDs vs. flash card reader devices which may not have been included in the initial table/database. This review process may help to eliminate any corner cases or anomalies from consideration.

(4) Periodically apply this new information to update the table/database and dynamically update driver.

As mentioned, new USB mass storage devices implementing asynchronous notification may do so via an additional interrupt endpoint inserted in the interface descriptor bundle exposed to the host. Legacy (or Down level) hosts, being unaware of this new asynchronous notification functionality, may simply ignore the additional endpoint and remain unable to take advantage of the new feature.

However, only a newer host system is able to recognize and utilize this new asynchronous notification mechanism. It does so by selecting the new interrupt endpoint and maintaining a persistent, outstanding request on this endpoint for as long as the device remains in an active D0 power state. The request is completed by the device upon any media change event generated by the device. Following this, the host re-issues another interrupt endpoint request to replace the recently completed request. As a device transitions to the inactive D3 power state, the host system cancels this outstanding request to the interrupt endpoint. Subsequently as the device resumes to the active D0 power state, either as a result of device wake signaling corresponding to a locally detected media change on the device or due to a host-initiated transition, the host re-establishes the persistent interrupt endpoint asynchronous notification request.

Several Processing Embodiment

Figure 4:
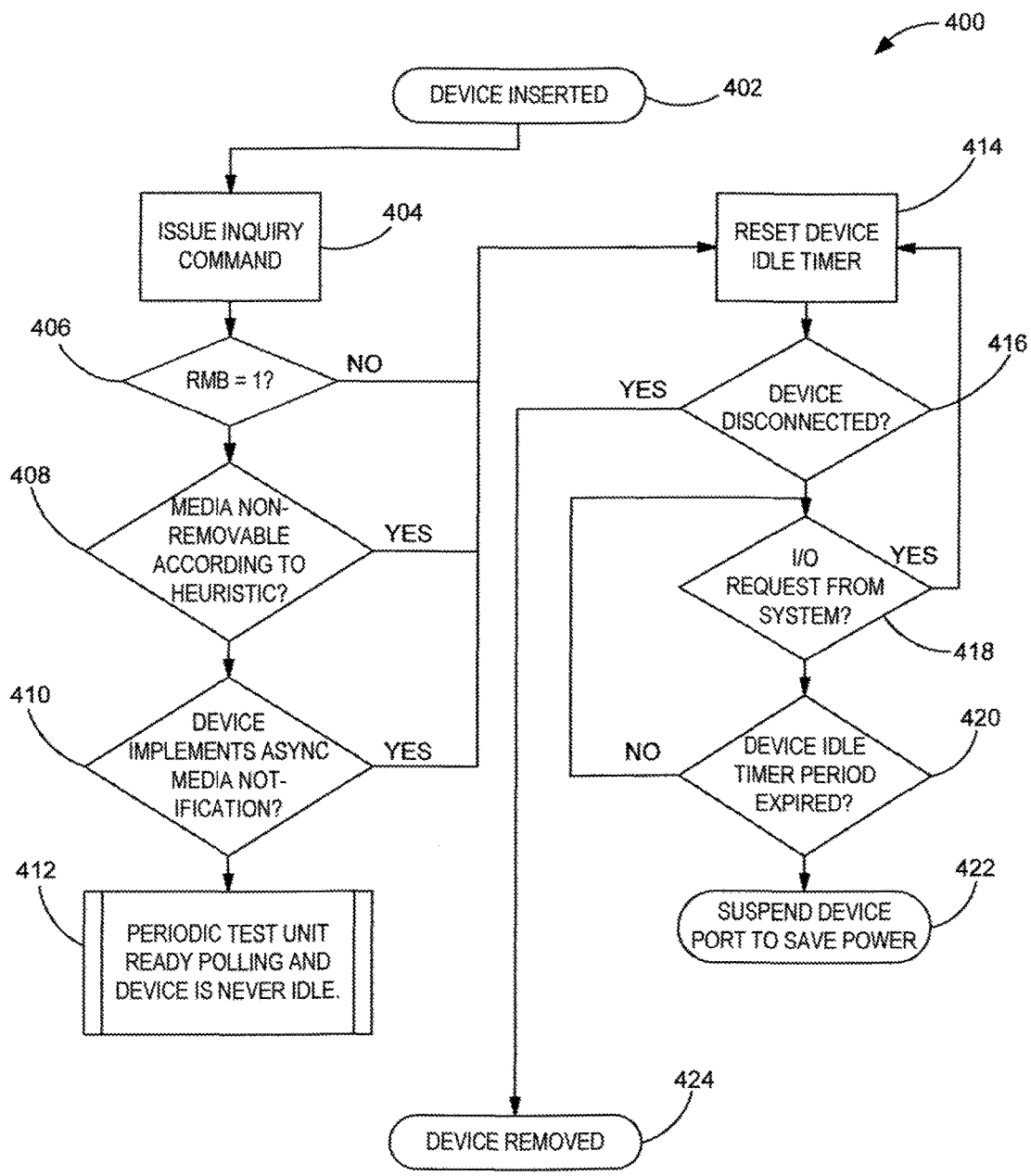
FIG. 4 is one flowchart embodiment of a process to identify and/or distinguish between legacy devices that may or may not have removable media.

FIG. 4 depicts one flowchart embodiment (400) of a process that may help to identify and/or distinguish between legacy devices that may or may not have removable media and help to save power.

At 402, a device may be inserted into a hub and, at a later time, the system may issue an Inquiry command (i.e., some ready command) at 404. If the device reports back that it does not have removable media (RMB=0), then the system may transition to power saving path at 414, where the device idle timer may be reset. The system may receive a report that the device is disconnected—in which case, the device may be removed from further consideration at 424.

If, however, there is an I/O request from the system, then the device idle timer may be reset back at 414, while the request is being served. If there is no such I/O request, the device's idle timer may become expired at 420. If so, it may be possible to suspend the device port to save power at 422.

If, however, back at 406, the device reports RMB=1 (i.e., that it has removable media), then the system may apply some heuristic testing to determine whether the device truly has removable media. In one embodiment, such heuristic testing may proceed according to those given above. If the device has non-removable media according to the heuristics, then the process can transition to 414 and proceed accordingly.

Otherwise, the system may further inquire as to whether the device implements asynchronous media notification (e.g., according BOT/UASP specification extension or any other specification that may support such asynchronous notification). If so, then the system may transition to 414. Otherwise, the system may implement periodic TUR polling and the device may not become idle.

Figures 5, 6:
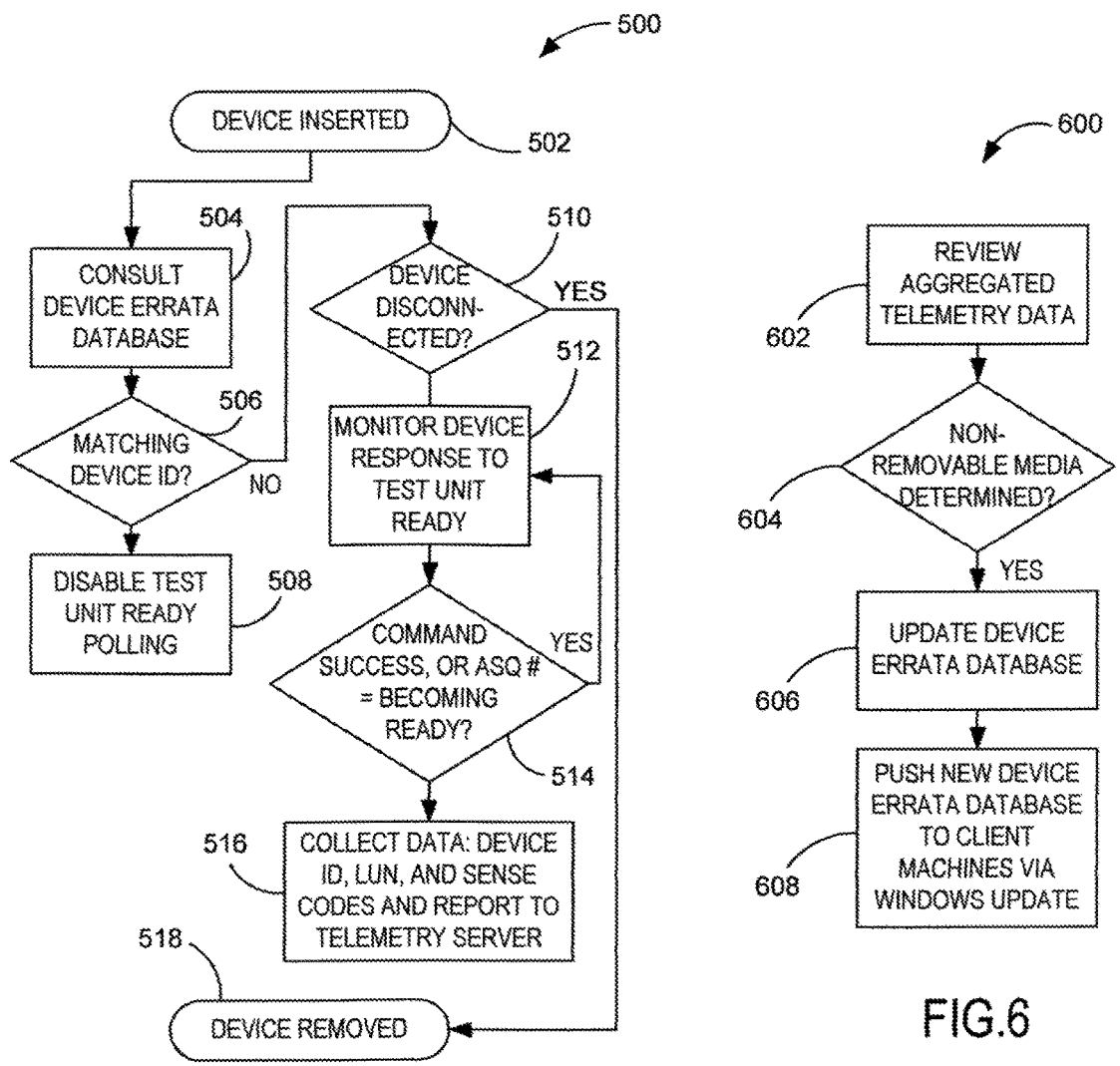
FIG. 5 is another flowchart embodiment of a process to identify devices that may be misreporting their removable media status and help implement power savings.
FIG. 6 is yet another flowchart embodiment of a process which collects and aggregates telemetry data from participating host systems.

FIG. 5 is another flowchart embodiment (500) that may complement other processes (e.g., FIG. 4 or the like) that may help to implement power savings—as well as update and refine the metadata about devices that may be misreporting their removable media status. At 502, the device may be inserted. The system may consult a table/database to determine the status of the particular device at 504. If the device is listed as one that does not have removable media at 506, then the system may disable TUR polling for that device at 508.

Otherwise, if there is no database entry, then the system may transition to 510 and detect whether the device becomes disconnected. If so, then the system may transition to a device removed state 518. Otherwise, the system may monitor the device's response to TUR polling. If there is response indicating absent media, then the system may collect the data on the device and report the device via telemetry at 516. Otherwise, the system may continue to monitor the device's response to TUR polling and proceed accordingly.

FIG. 6 is yet another flowchart embodiment (600) of a process (e.g., possibly running offline on a server system) which collects and aggregates telemetry data from participating host systems. This may be used to update tables/databases to properly identify devices that may be misidentifying its removable media status. This process may proceed either off-line or otherwise. At 602, the system may review telemetry data to update a device database. With the database so updated, the system may determine whether there is any non-removable media at 604. If so, then the system may update the database for the purpose of informing all updateable host systems about the handling of the particular device at 606. If there is a new device to report, then the system may push this information to the database. At some later point in time, this database may be shared with all updateable host systems via a suitable update process (e.g., via Windows Update® computer service).

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for managing storage devices, the method comprising:
   sending a media polling message from a host system to a first storage device, the media polling message querying whether the first storage device is ready;
   if the first storage device responds as not being ready, updating a database with an indication that the first storage device has removable media;
   sending another media polling message from the host system to a second storage device, the media polling message querying whether the second storage device is ready;

receiving an indication that the second storage device does not have removable media; and in response to the indication that the second storage device does not have removable media, disabling polling by the host system to the second storage device.

2. The method of claim 1, wherein a response to the media polling message includes an indication of whether the first storage device is a removable storage device.

3. The method of claim 1, further comprising:

receiving an asynchronous notification message from a third storage device; and in response to the asynchronous notification message from the third storage device, updating the database with an indication that the third storage device has removable media.

4. The method of claim 1, wherein the database correlates storage devices to indications of the removability of media for the storage devices.

5. The method of claim 4, further comprising:

searching the database for an entry corresponding to a third storage device;

locating the entry corresponding to the third storage device; and in response to the locating of the entry corresponding to the third storage device in the database, disabling polling to the third storage device by the host system.

6. The method of claim 4, wherein the storage devices include at least flash memory drives.

7. The method of claim 1, further comprising:

sharing, with a second host system, data regarding storage devices that provide metadata falsely indicating removability of media.

8. The method of claim 7, wherein sharing the data comprises:

uploading at least one of a hardware ID, a VID, a PID, or a LUN to the second host system.

9. The method of claim 7, wherein sharing the data comprises:

reporting the data to telemetry server.

10. The method of claim 1, further comprising:

receiving, from a second host system, data regarding storage devices that provide metadata falsely indicating removability of media.

11. A computing device, comprising:

a memory and a processor, wherein the memory and the processor are respectively configured to store and execute instructions, including instructions for causing the computing device to perform operations, the operations including:

interfacing the computing device to at least one storage device;

sending a media polling message to the at least one storage device;

receiving a response to the media polling message from the at least one storage device, wherein the response is falsely indicative of the at least one storage device having removable media;

determining that the response is falsely indicative of the at least one storage device having removable media; and in response to the determining, disabling media polling for the at least one storage device.

12. The computing device of claim 11, wherein the operations also include:

in response to the determining, adding an entry corresponding to the at least one storage device into a database, the entry indicating that the at least one storage device falsely provides removable media indications.

13. The computing device of claim 11, wherein determining that the response is falsely indicative of the at least one storage device having removable media includes:

searching a database of storage devices known to falsely indicate removability of media.

14. The computing device of claim 13, wherein the operations also include:

sharing, with another computing device, data regarding storage devices known to falsely indicate removability of media.

15. The computing device of claim 14, wherein sharing the data comprises:

reporting the data to telemetry server.

16. The computing device of claim 15, wherein the operations also include:

receiving, from another computing device, data regarding storage devices known to falsely indicate removability of media.

17. A method for interacting with a storage device, the method comprising:

sending a media polling message to the storage device;

receiving a response to the media polling message from the storage device, wherein the response is falsely indicative of the storage device having removable media;

determining that the response is falsely indicative of the storage device having removable media; and in response to the determining, disabling media polling for the storage device.

18. The method of claim 17, further comprising:

in response to the determining, adding an entry corresponding to the at least one storage device into a database, the entry indicating that the storage device falsely provides removable media indications.

19. The method of claim 17, wherein determining that the response is falsely indicative of the at least one storage device having removable media includes:

searching a database of storage devices known to falsely indicate removability of media; and locating, in the database, an entry corresponding to the storage device.

20. The method of claim 19, wherein the method is performed on a first computing device, and wherein the method further comprises:

receiving, from another computing device, data regarding storage devices known to falsely indicate removability of media; and updating the database based on the received data.

* * * * *